United States Patent [19]

Bozeman, Jr.

[11] Patent Number: 4,977,395
[45] Date of Patent: Dec. 11, 1990

[54] VIBRATION ANALYZER

[75] Inventor: Richard J. Bozeman, Jr., Dickinson, Tex.

[73] Assignee: The United States of America as represented by the Administrator of the National Aeronautics and Space Administration, Washington, D.C.

[21] Appl. No.: 304,154

[22] Filed: Jan. 31, 1989

[51] Int. Cl.$^5$ .............................................. G08B 21/00
[52] U.S. Cl. ........................................ 340/683; 73/658
[58] Field of Search .................. 340/683, 529; 73/660, 73/659, 658

[56] References Cited

U.S. PATENT DOCUMENTS

| | | | |
|---|---|---|---|
| 3,573,446 | 4/1971 | Berland | 235/156 |
| 3,979,739 | 9/1976 | Birchall | 340/683 |
| 4,213,114 | 7/1980 | Cochard | 340/683 |
| 4,302,813 | 11/1981 | Kurihara | 73/660 |
| 4,321,680 | 3/1982 | Bertrand et al. | 364/485 |
| 4,380,172 | 4/1983 | Imam et al. | 73/659 |
| 4,429,578 | 2/1984 | Darrel et al. | 340/683 |
| 4,514,797 | 4/1985 | Begin | 340/683 |
| 4,559,828 | 12/1985 | Lizka | 73/658 |
| 4,608,647 | 8/1986 | White et al. | 364/481 |
| 4,703,433 | 10/1987 | Sharrit | 364/485 |

Primary Examiner—Joseph A. Orsino
Assistant Examiner—Geoff Sutcliffe
Attorney, Agent, or Firm—Hardie R. Barr; John R. Manning; Edward K. Fein

[57] ABSTRACT

The invention relates to monitoring circuitry for the real time detection of vibrations of a predetermined frequency and which are greater than a predetermined magnitude. The circuitry produces an instability signal in response to such detection. The circuitry is particularly adapted for detecting instabilities in rocket thrusters, but may find application with other machines such as expensive rotating machinery, turbines, etc. The monitoring circuitry identifies when vibration signals are present having a predetermined frequency of a multi-frequency vibration signal which has an RMS energy level greater than a predetermined magnitude. It generates an instability signal only if such a vibration signal is identified. The circuitry includes a delay circuit which responds with an alarm signal only if the instability signal continues for a predetermined time period. When used with a rocket thruster, the alarm signal may be used to cut off the thruster if such thruster is being used in flight. If the circuitry is monitoring testing of the thruster, it generates signals to change the thruster operation, for example, from pulse mode to continuous firing to determine if the instability of the thruster is sustained once it has been detected.

12 Claims, 3 Drawing Sheets

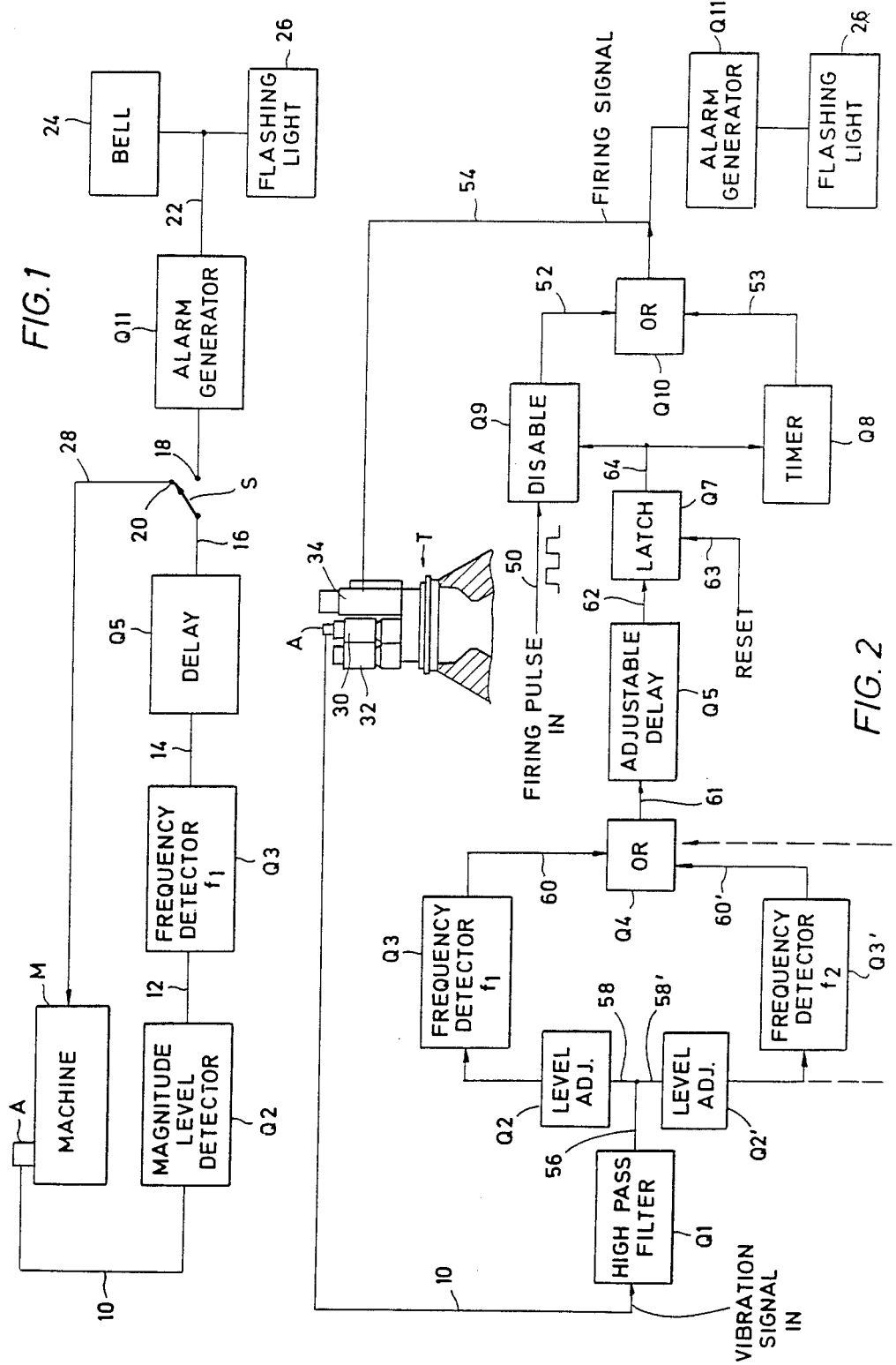

VIBRATION ANALYZER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates generally to monitoring apparatus for identifying instabilities in machinery. In particular, the monitoring apparatus of the invention identifies multi-frequency vibrations of a machine which are above a predetermined magnitude and determines if a vibration of a predetermined frequency is present so as to generate a signal to modify operation of the machine. Still more particularly, the monitoring apparatus of the invention is provided for testing of a rocket thruster.

2. Description of the Prior Art

This invention resulted from an acceptance testing project for space shuttle reaction control system (RCS) thrusters. Instabilities in rocket thrusters have been extremely rare, only occurring in approximately three out of 50,000 firings. Even though rare, it is important to detect such instabilities of an RCS thruster because of its critical importance to a space flight mission, especially one like manned shuttle flights.

Previous methods of detecting instabilities of an RCS thruster during acceptance testing was to fit the thruster with an accelerometer to produce an analog signal representative of the multiple frequency vibrations of the thruster when it was fired. A broad frequency spectrum was obtained of the vibrations signal to determine components of high magnitude or "g" loads. But high g loads may be caused by any one of a number of factors other than thruster instability. For example the test stand on which the thruster is placed may vibrate.

Consequently, when high g loads were detected, engineers were required to stop the test and analyze the test data to determine if the high g loads were occurring at the "critical" frequencies indicative of rocket instability or at some other frequency due to other causes. The critical frequencies which indicate rocket instability are determined by the geometry of the rocket engine cavity. Such critical frequencies are also known as one or more resonant frequencies of the thruster engine.

INDENTIFICATION OF OBJECTS OF THE INVENTION

Accordingly, it is a primary object of this invention, as a result of the identification of the problems above-identified in the prior art testing, to provide test or monitoring apparatus by which high g loads at particular frequencies of interest, i.e., frequencies of rocket instability, can be identified in real time during actual firing of the rocket.

Another primary object of the invention is to modify thruster firing in real time if rocket instability is determined.

Another object of the invention is to apply such monitoring apparatus to machines other than rocket engines (e.g., large turbines) to identify one or more critical vibration frequencies of such machines and trigger alarms when predetermined limits are exceeded to indicate the need for routine maintenance or to shut the machine down to prevent catastrophic failure.

SUMMARY

The objects identified above as well as other features and advantages of the invention are incorporated according to the invention in a monitoring apparatus for selectively detecting high magnitude vibrations. The apparatus includes an accelerometer mounted on a machine which may be subject to instability or malfunction which may be identified by certain known frequencies. The apparatus is especially suited for identifying certain "resonant" frequencies which are a function of a rocket thruster or engine cavity, but the apparatus may also find application for identifying, in real time, malfunctions or instability vibration frequencies of large rotating machinery such as large turbine generators, jet engines, and the like.

A detecting circuit is provided to accept the output of the multifrequency vibration signal from the accelerometer. The detecting circuit identifies at least one vibration having a predetermined frequency when the multi-frequency vibration signal from the accelerometer is greater than a predetermined RMS magnitude. When such identification is made, an instability signal is generated. Other vibrations of different predetermined frequencies may also be identified.

The apparatus of the invention further includes an alarm generator responsive to the instability signal for generating an audible or visual alarm when the instability signal is present. Preferably a delay signal is generated if the instability signal continues for a predetermined time period. Providing such a delay assures that an alarm is generated only during long enough periods to insure that the machine is indeed malfunctioning or is instable and that the instability signal is not a short time spike or the like which is not indicative of a serious problem of the machine.

With the apparatus in place for monitoring rocket thruster firing testing, pulsed mode signals used to test the thruster are disabled by additional circuitry of the apparatus to continuous mode signals so that the thruster may be operated in a continuous mode. Continuous mode operation during testing of the rocket thruster allows additional data to be collected for it which may be used to determine the nature of the instability detected. Alternatively, the machine or the thruster may be commanded by circuitry of the apparatus to terminate operation. Such circuitry is useful for rocket engines during flight operation and for other machines where shut down is indicated when an instability or malfunction is detected.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which:

FIG. 1 is a block diagram representation of the apparatus in combination with a machine for detecting the presence of instability vibrations and either generating an alarm or a command to shut down or modify operation of the machine;

FIG. 2 is a block diagram representation of the apparatus in combination with a rocket thruster subjected to test firing for detecting the presence of instability vibrations at one or more predetermined frequencies and for changing the firing signal which controls the firing mode of the thruster.

DESCRIPTION OF THE INVENTION

Figure 3A:
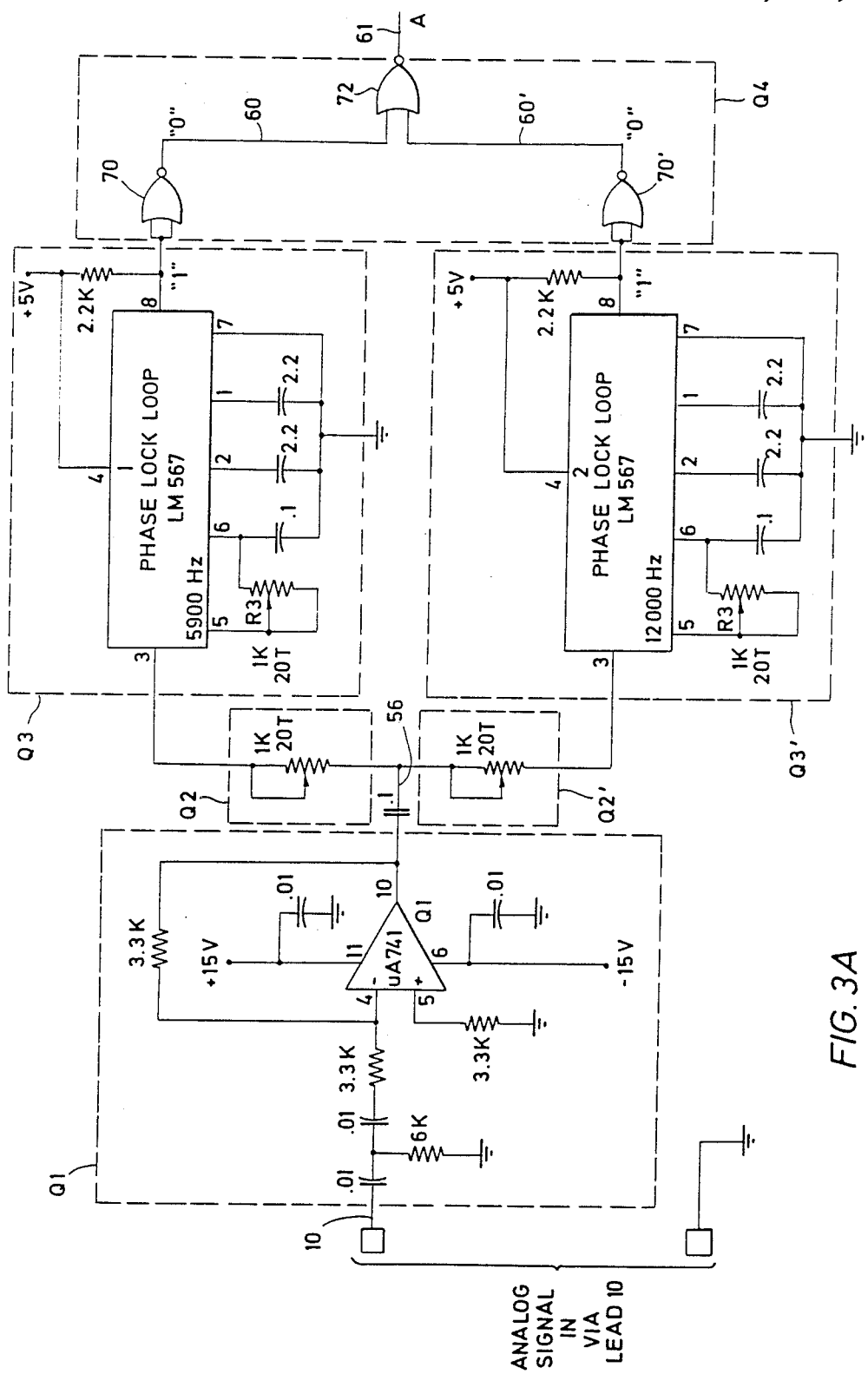
FIGS. 3A and 3B are schematics of preferred circuitry corresponding to the functional blocks illustrated in FIG. 2.

FIG. 1 shows a block diagram which generally illustrates the invention. An accelerometer A is placed on machine M such that during operation of the machine, a multiple frequency vibration signal, preferably in analog form, is present on output lead 10 of the accelerometer 10. The machine M may be any machine for which predetermined frequencies of vibration indicates that malfunction or instability is occurring in the machine. Such machines may be large rotating machinery like turbines used in electrical generation or may be electrical generators which are turned by such turbines. The machines may also be jet engines or the like. The machines may be rocket thrusters or engines for which this invention is specifically provided.

The multiple frequency vibration signal on lead 10 is applied to a magnitude level detector Q2 where a measure of the energy in the vibration signal is compared with a predetermined level so as to detect specific vibrations of predetermined frequencies. Such energy or power measure of the vibration signal on lead 10 is preferred to be the root-mean squared (RMS) value of the signal on lead 10. If a predetermined RMS value of the multi-frequency vibration signal on lead 10 is exceeded, the frequency detector Q3 is enabled via lead 12. Such frequency detector Q3 determines whether or not a vibration of a predetermined frequency $f_1$ is present in the multi-frequency vibration signal produced by accelerometer A. If such vibration is present, frequency detector Q3 produces an instability signal on lead 14. Delay circuit Q5 determines whether or not such instability signal has continued for a predetermined delay time period, and if it has, produces a delay signal on lead 16.

If switch S is placed in position 18, the delay signal is applied to alarm generator Q11 which in response produces an alarm signal on lead 22 for sounding an audible alarm via bell or producing a visual alarm via flashing light 26. If switch S is placed in position 20, the delay signal on lead 16 is applied on lead 28 to machine M to either shut it down or to change its mode of operation. Of course, an alarm could simultaneously be generated, if desired, when machine M is shut down or has its mode of operation changed.

FIG. 2 illustrates the preferred embodiment of the invention in detecting instabilities of a rocket thruster T during acceptance test procedures. An accelerometer A is placed on the engine T such that during firing of engine T, accelerometer A produces a multi-frequency analog signal on lead 10 which corresponds to vibrations of the engine T. The accelerometer A is preferably placed on oxidizer valve 30 shown schematically in FIG. 2 along with the fuel valve 32 and electrical junction box 34. The multi-frequency vibration signal on lead 10 from accelerometer A of thruster T results from the test firing of thruster T. Such test firing is usually done is a pulse train mode from a pulse train generator (not shown) via lead 50 to disable circuit Q9. Such circuit is normally not disabled and such pulse train from lead 50 is passed along to OR circuit Q10 and via lead 54 to electrical junction box 34 for controlling the firing of thruster T in the normal pulse mode.

As the rocket or thruster T begins to fire in the pulse mode (preferably an 80 ms pulse mode) an analog vibration signal is generated on lead 10 by accelerometer A which is preferably a piezoelectric accelerometer/charge amplifier. The signal on lead 10 is routed through high pass filter Q1, which excludes or attenuates all frequencies below a predetermined frequency, preferably below 4,825 HZ. The filter, while not required in all arrangements of the apparatus of the invention, minimizes mixing effects of frequencies associated with the multiple frequencies of the signal on lead 10. Such mixing effects could additively generate frequencies at the predetermined detect frequencies of frequency detectors Q3.

The filtered multi-frequency vibration signal on lead 56 output from high-pass filter Q1 is applied to level adjust circuits Q2, Q2' etc., where amplitude "trigger" levels are set. In the preferred embodiment of testing the rocket thruster T, such levels are set to an amplitude equivalent of 40 "G" RMS. Such circuits only provide sufficient amplitude for triggering frequency detector circuits Q3, Q3' etc., if the energy in the filtered multi-frequency signal appearing on leads 58, 58' etc. is greater than an signal level equivalent to a vibration force of 40 times the force of gravity calculated according to conventional root-mean-squared formulations.

With a signal of energy greater than the predetermined level (e.g., 40 G RMS), the frequency detectors Q3, Q3' determine if their preset frequencies ($f_1$ is preferably 5,900 HZ for the rocket thruster, $f_2$ is preferably 12,000 HZ±approximately 300 HZ) are present in the signal. As explained below in connection with schematic circuits, frequency detectors Q3, Q3' etc. are preferably phase lock loop integrated circuit chips, which produce a "detect" signal on leads 60, 60' etc. if such detectors lock onto a predetermined frequency of a vibration indicative of malfunction or instability. The particular frequencies which indicate rocket engine instability are a function of the geometry of the rocket engine cavity which has associated with it a "natural" or resonant frequency. Such frequencies would of course be different for different geometries of other rocket engines and would be different for rotating machinery such as turbines, generators, jet engines, etc. Additional vibration components of different frequencies could be detected by additional frequency detectors indicated by dashed lines in parallel to frequency detectors Q3, Q3'.

Instability signals on leads 60, 60' etc., are applied to OR circuit Q4 and via lead 61 to adjustable delay circuit Q5 which produces a delay signal on lead 62 if one or more of such instability signals continues for a predetermined adjustable delay time period (e.g., 40 ms for the rocket thruster). A delay signal on lead 62 is applied to latch circuit Q7 which "sets" or latches and produces a continuous set signal on lead 64 which is applied to disable circuit Q9 and to timer circuit Q8. Disable circuit Q9 disables transmission of the input firing pulse via lead 50 to OR circuit Q10 via lead 52. The timer circuit Q8, when started by the set signal on lead 64, produces a continuous signal on lead 53 for a preselected period of time for controlling engine T firing via OR gate Q10 and lead 54.

With testing of the rocket engine T, it is desirable to test the engine in a continuous mode after an instability has been detected. Consequently, timer Q8 is set to control the time of continuous firing, preferably 2 seconds, during which external recording devices may be used to independently monitor the accelerometer data on lead 10 or from other accelerometers which may be placed on thruster T. An alarm generator Q11 responsive to the signal from timer Q8 activates flashing light 26 to indicate that an instability condition has been sensed by the apparatus of FIG. 2.

Figure 3B:
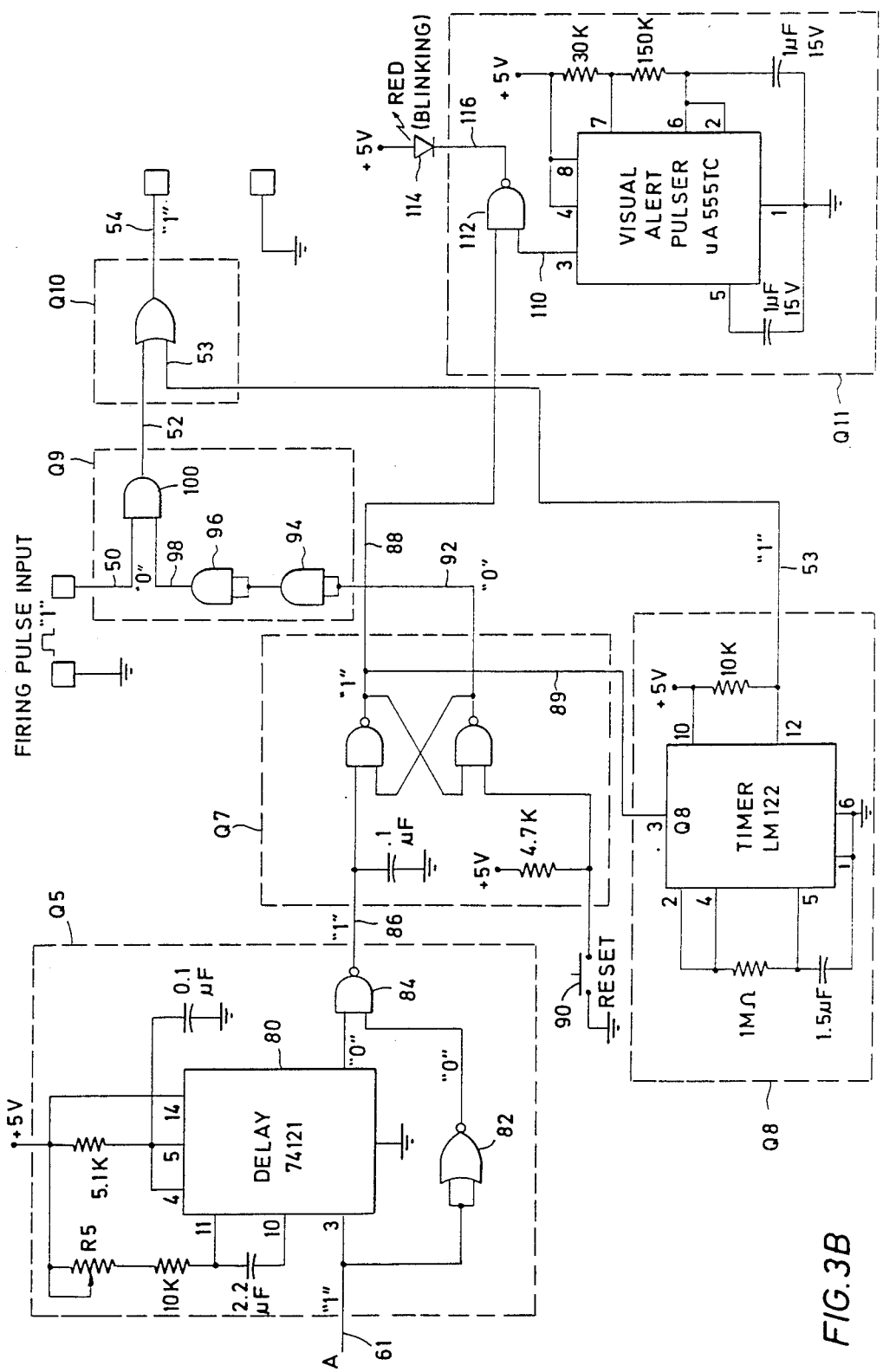

Turning now to the preferred embodiment of the functional blocks as depicted in FIG. 2, reference to FIGS. 3A and 3B indicates that high pass filter Q1 is realized by operational amplifier UA741 configured with feedback resistors and capacitors of the valves indicated to realize a cut off frequency of 4825 HZ. The multi-frequency vibration signal on lead 10 appears as a filtered vibration signal on lead 56.

The signal on lead 56 is applied to level adjust circuits Q2, Q2', each realized as a twenty turn 1K potentiometer. The setting of the potentiometer Q2 determines the signal level of the filtered vibration signal on lead 56 which is applied to the phase lock loop integrated circuit of frequency detector Q3. In other words, with the potentiometer adjusted such that 1K is not in the signal path to Q3, the phase lock loop is easily triggered into operation because the filtered vibration signal which is applied to it is relatively large. On the other hand, if the potentiometer of Q2 is adjusted to place the 1K resistance in the signal path, the phase lock loop is not so easily triggered and a higher magnitude RMS value of the signal is required to trigger the phase lock loop circuitry. In the preferred embodiment of the invention, the potentiometers of Q2, Q2' are set such that the filtered signal on lead 56 which triggers the phase lock loop circuitry of Q3, Q3' represents about a 40 g RMS magnitude.

The circuitry of frequency detector circuits Q3, Q3' employ phase lock loop circuits LM567, one preferably set to detect a 5900 HZ vibration component, the other to detect a 12,000 HZ component. The valves of resistors and capacitors shown with appropriate settings of potentiometer R3 determine the particular frequency to be detected. NOR gates 70, 70' are provided at the outputs of the LM567 circuits which produce a low or "0" output on leads 60 or 60' if a vibration component 5900 HZ or 12,000 HZ is detected. The leads 60, 60' are applied to NOR circuit 72 to produce a high or "1" output on lead 61 if either a 5900 HZ or a 12,000 HZ vibration signal is detected. A "1" appearing on lead 61 is called a detection signal.

As shown in FIG. 3B, the "1" detection signal appears on lead 61 and is applied to adjustable delay circuit 80 which is realized by an integrated circuit 74121. When a "1" signal is applied to circuit 80, a "0" is produced at its output only after a time period determined by the potentiometer R5. Resistors and capacitors of the valves shown associated with delay circuit are provided to produce a delay of about 40 msec.

Simultaneously the "1" signal on lead 61 is applied to NOR gate 82 which produces a continuous "0" at its output only if the "1" detection signal on lead 61 continuously is present. The NAND gate 84 produces a "1" output on lead 86 only if the "1" signal on lead 61 continues to be present after the predetermined time period set by integrated circuit 80. The predetermined time period for testing the rocket thruster T is 40 msec.

Once a "1" "delay signal" is produced on lead 86 and is applied to latch circuit Q7, the output on lead 88 is changed from a normal low or "0" level and latched to a "1" level until reset by reset switch 90. Simultaneously, the output on lead 92 is latched from a normally "1" to a latched "0" on lead 92.

Timer circuit Q8, responding to the "1" delay signal applied from leads 88 and 89 generates a "1" signal on lead 53 under control of timer integrated circuit LM122. The resistors and capacitors associated with timer circuit LM122 produce a timer signal on lead 53 of about two seconds. In the embodiment of the invention for controlling the testing of thruster T, the "1" signal on lead 53 remains for two seconds. Such signal is called a "timer signal".

The disable circuit Q9 is realized by AND gates of integrated circuit 7408. The latched "0" signal on lead 92 is transmitted to lead 98 via AND gates 94 and 96 and to AND gate 100 which has the pulse train firing pulses or "1s" applied also to it. The result on lead 52 is a "0" output on lead 52 applied to OR gate of Q10, effectively disabling transmission of the firing pulses via lead 50. The OR gate of Q10 (realized by integrated circuit 7432) also has the "timer" "1" signal applied via lead 53 to it. The output on lead 54 from OR gate Q10 is a continuous signal "1" signal for the duration of the "1" signal generated by timer circuit Q8. Such continuous signal remains until the reset switch 90 is activated, or other control circuitry in the thruster shuts down the continuous firing. During such continuous firing, other external recording devices (not illustrated) may be employed to independently monitor the accelerometer data.

The alarm generator circuit is realized by a free running pulser of integrated circuit UA555TC which outputs a pulsing signal at a visual frequency on lead 110. Such signal on lead 110 is transmitted via NAND gate 112 when enabled by the "1" delay signal on lead 88, to produce a blinking or flashing visual alarm in LED via lead 116. In the normal testing state of thruster T, the "0" applied on lead 88 prevents a pulsing signal from appearing on lead 116.

Various modifications and alterations in the described apparatus will be apparent to those skilled in the art of the foregoing description which does not depart from the spirit of the invention. For this reason, these changes are desired to be included in the appended claims. The claims which follow recite the only limitation to the present invention and the descriptive manner which is employed for setting forth the embodiments, and is to be interpreted as illustrative and not limitative.

What is claimed is:

1. Monitoring apparatus for detecting high magnitude vibration of a machine during its operation comprising
   accelerometer means for generating a vibration signal representative of multi-frequency vibrations of said machine during its operation,
   analog detecting circuit means responsive to said vibration signal for determining the presence of at lease on machine vibration of a predetermined frequency, when said vibration signal is greater than a predetermined magnitude and for producing a machine instability signal if such machine vibration is detected, and
   high-pass filter means disposed between said accelerometer means and said detecting circuit means for substantially blocking vibration signals below a predetermined filter frequency thereby producing a filtered signal representative of vibrations characterized by frequencies above said filter frequency, wherein said detecting circuit means includes magnitude level circuit means for adjusting the magnitude of said filtered signal to produce an adjusted magnitude filtered signal, and phase locked loop means responsive to said adjusted magnitude filtered signal and enabled only if said adjusted magnitude filtered signal is greater than a predetermined root mean squared level of said filtered signal and for generating said machine instability signal only if said vibration of said predetermined frequency is present in said adjusted magnitude filtered signal.

2. Apparatus for detecting instability of a rocket thruster during firing comprising, accelerometer means for generating a vibration signal representative of thruster vibrations during thruster firing, analog detecting circuit means responsive to said vibration signal for detecting the presence of any one or more of a plurality of thruster instability vibrations, each of said vibrations characterized by a predetermined frequency when said vibration signal has a magnitude greater than a predetermined magnitude, and for generating a thruster instability signal if any one or said instability vibrations is detected, delay circuit means responsive to said thruster instability signal for generating a delay signal if said thruster instability signal continues for a predetermined time period, wherein, said detecting circuit means includes amplitude level circuit means for adjusting the magnitude of said filtered signal to produce an adjusted magnitude filtered signal, and phase locked loop means responsive to said adjusted magnitude filtered signal and enabled only if said adjusted magnitude filtered signal is greater than a predetermined root mean squared level of said filtered signal and for generating said machine instability signal only if said vibration of said predetermined frequency is present in said adjusted magnitude filtered signal.

3. The apparatus of claim 2 wherein said thruster firing is operating in a pulsed mode in response to a pulse train signal, said apparatus further comprising, means responsive to said delay signal for disabling said pulse train signal and replacing it with a continuous thruster firing signal for operating said thruster in a continuous mode.

4. The apparatus of claim 3 further comprising highpass filter means disposed between said accelerometer means and said detecting circuit means for substantially blocking vibration signals frequencies below a filter frequency thereby producing a filtered signal representation of vibrations characterized by frequencies above said filter frequency.

5. The apparatus of claim 2 further comprising
means responsive to said delay signal for terminating firing of said rocket thruster.

6. Monitoring apparatus for detecting high magnitude vibration of a machine during its operation comprising, accelerometer means for generating a vibration signal representative of multi-frequency vibrations of said machine during its operation, analog circuit means responsive to said vibration signal for determining the presence of at least one machine vibration of a predetermined frequency, only when said vibration signal is greater than a predetermined magnitude and for producing a machine instability signal if such machine vibration is detected, and additional circuit means responsive to said vibration signal for determining the presence of additional machine vibrations at each of additional predetermined frequencies only when said vibration signal is greater than predetermined magnitudes and for producing said machine instability signal if any one or more of said additional machine vibrations is detected.

7. Apparatus for detecting instability of a rocket thruster during firing comprising, accelerometer means for generating a vibration signal representative of thruster vibrations during thruster firing, analog detecting circuit means responsive to said vibration signal for detecting the presence of any one or more of a plurality of thruster instability vibrations, each of said vibrations characterized by a predetermined frequency when said vibration signal has a magnitude greater than a predetermined magnitude, and for generating a thruster instability signal if any one or said instability vibrations is detected, wherein said detecting circuit means includes amplitude level circuit means for adjusting the magnitude of said filtered signal to produce an adjusted magnitude filtered signal, and phase locked loop means responsive to said adjusted magnitude filtered signal and enabled only if said adjusted magnitude filtered signal is greater than a predetermined root mean squared level of said filtered signal and for generating said machine instability signal only if said vibration of said predetermined frequency is present in said adjusted magnitude filtered signal.

8. Monitoring apparatus for detecting high magnitude vibration of a machine during its operation comprising, accelerometer means for generating a vibration signal representative of multi-frequency vibrations of said machine during its operation, detecting circuit means responsive to said vibration signal for detecting the presence of at least one machine vibration of a predetermined frequency, when said vibration signal is greater than a predetermined magnitude and for producing a machine instability signal if such machine vibration is detected, high pass filter means disposed between said accelerometer means and said detecting circuit means for substantially blocking vibration signals below a predetermined filter frequency thereby producing a filtered signal representative of vibrations characterized by frequencies above said filter frequency, wherein said detecting circuit means includes amplitude level circuit means for adjusting the magnitude of said filtered signal to produce an adjusted magnitude filtered signal, and phase locked loop means responsive to said adjusted magnitude filtered signal and enabled only if said adjusted magnitude filtered signal is greater than a predetermined root mean squared level of said filtered signal and for generating said machine instability signal only if said vibration of said predetermined frequency is present in said adjusted magnitude filtered signal.

9. The apparatus of claim 8 further comprising, delay circuit means responsive to said machine instability signal for generating a delay signal if said machine instability signal continues being generated after a predetermined time period.

10. The apparatus of claim 8 wherein said machine is a rocket thruster and said machine instability signal is a rocket thruster instability signal.

11. The apparatus of claim 10 wherein said add machine operation is thruster firing in a pulsed mode in response to a pulse train signal, said apparatus further comprising,
means responsive to said delay signal for disabling said pulse train signal and replacing it with a continuous thruster firing signal for operating said thruster in a continuous mode.

12. The apparatus of claim 10 further comprising
means responsive to said delay signal for terminating firing of said rocket thruster.

* * * * *